March 24, 1931.  E. E. EICKMEYER  1,797,947
LIQUID DISPENSING APPARATUS
Filed June 27, 1925  5 Sheets-Sheet 2
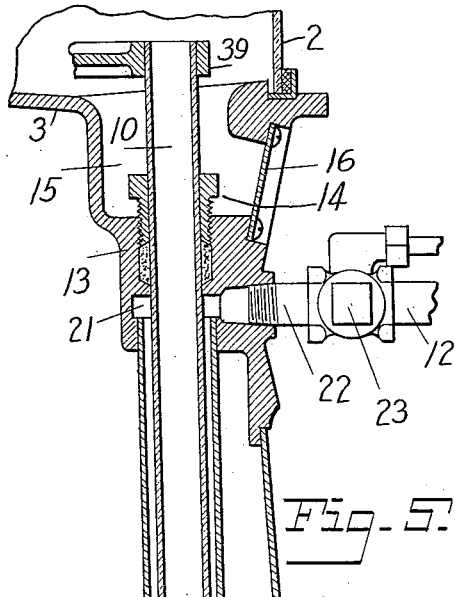
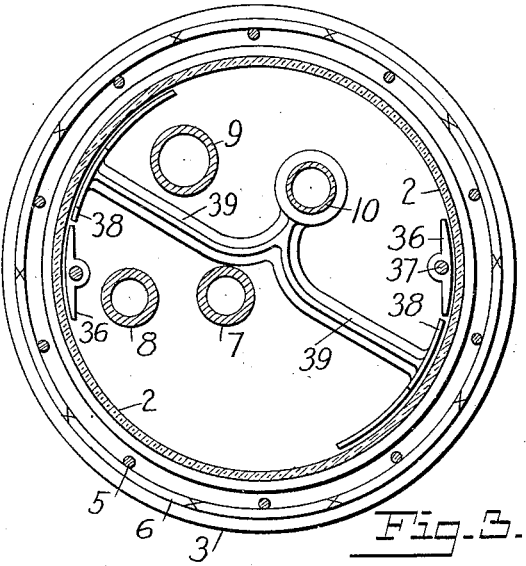
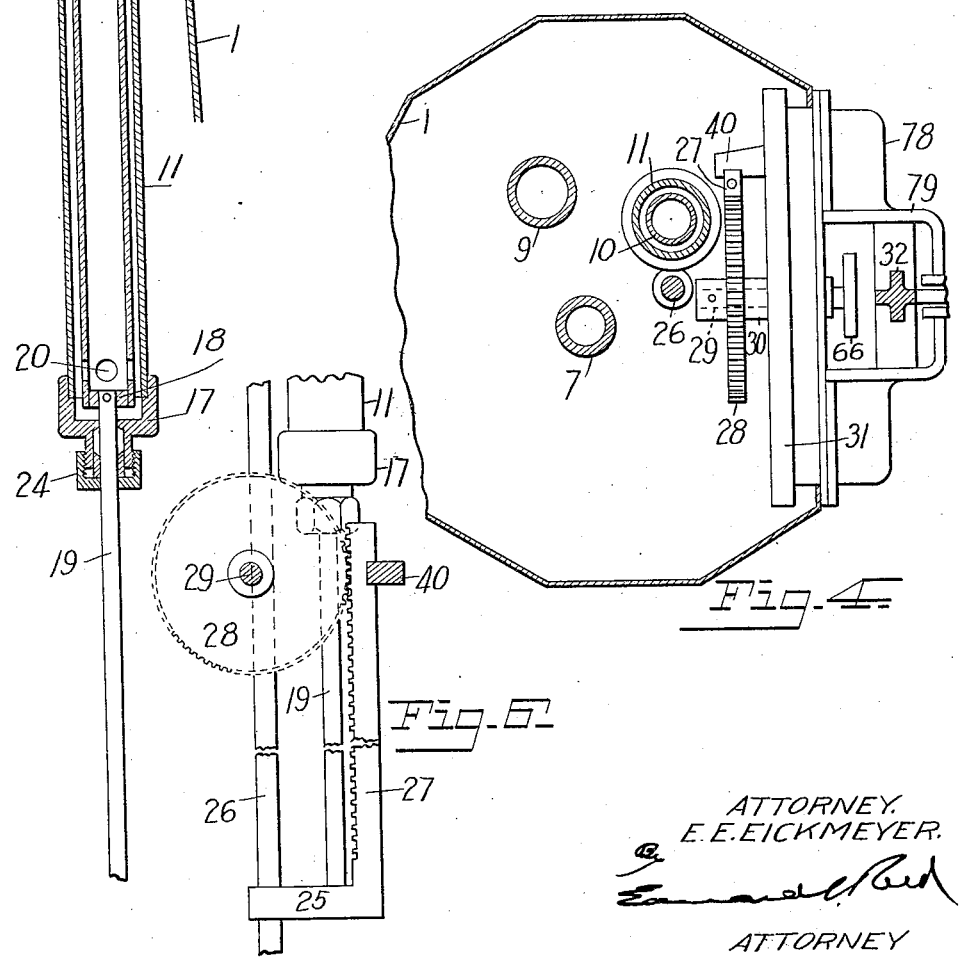
ATTORNEY.
E. E. EICKMEYER.
ATTORNEY March 24, 1931.  E. E. EICKMEYER  1,797,947
LIQUID DISPENSING APPARATUS
Filed June 27, 1925   5 Sheets-Sheet 3
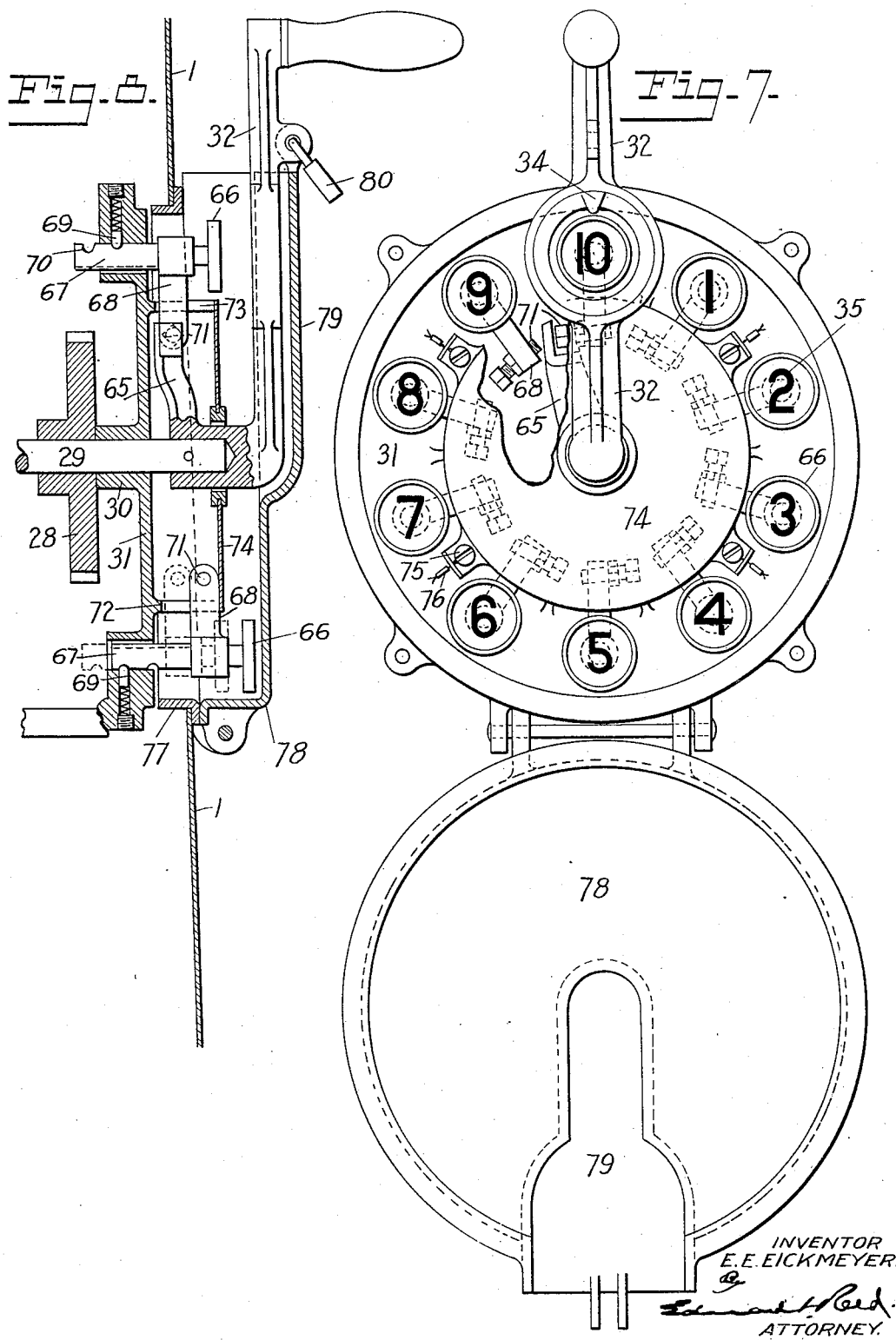
INVENTOR
E. E. EICKMEYER.
ATTORNEY.

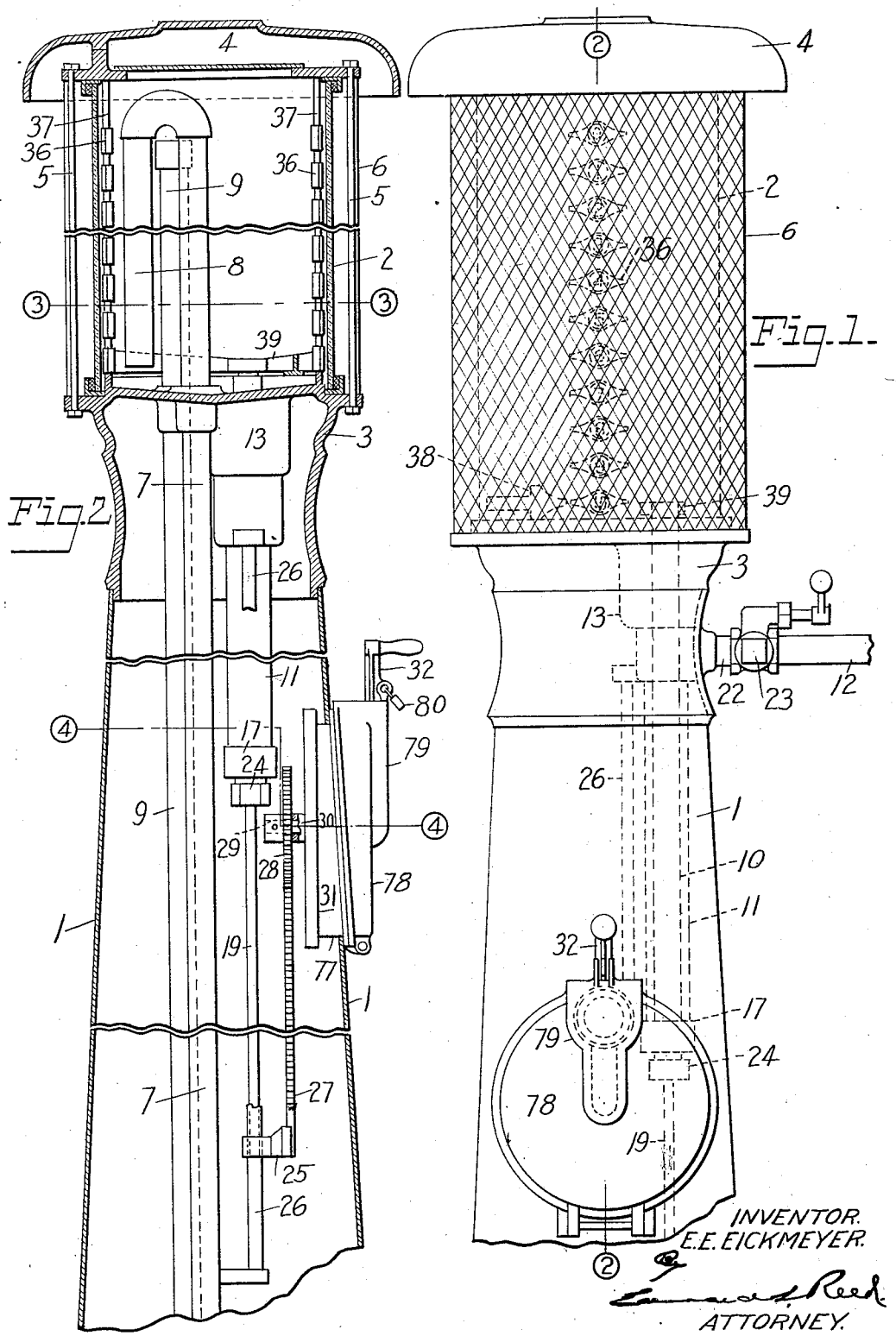

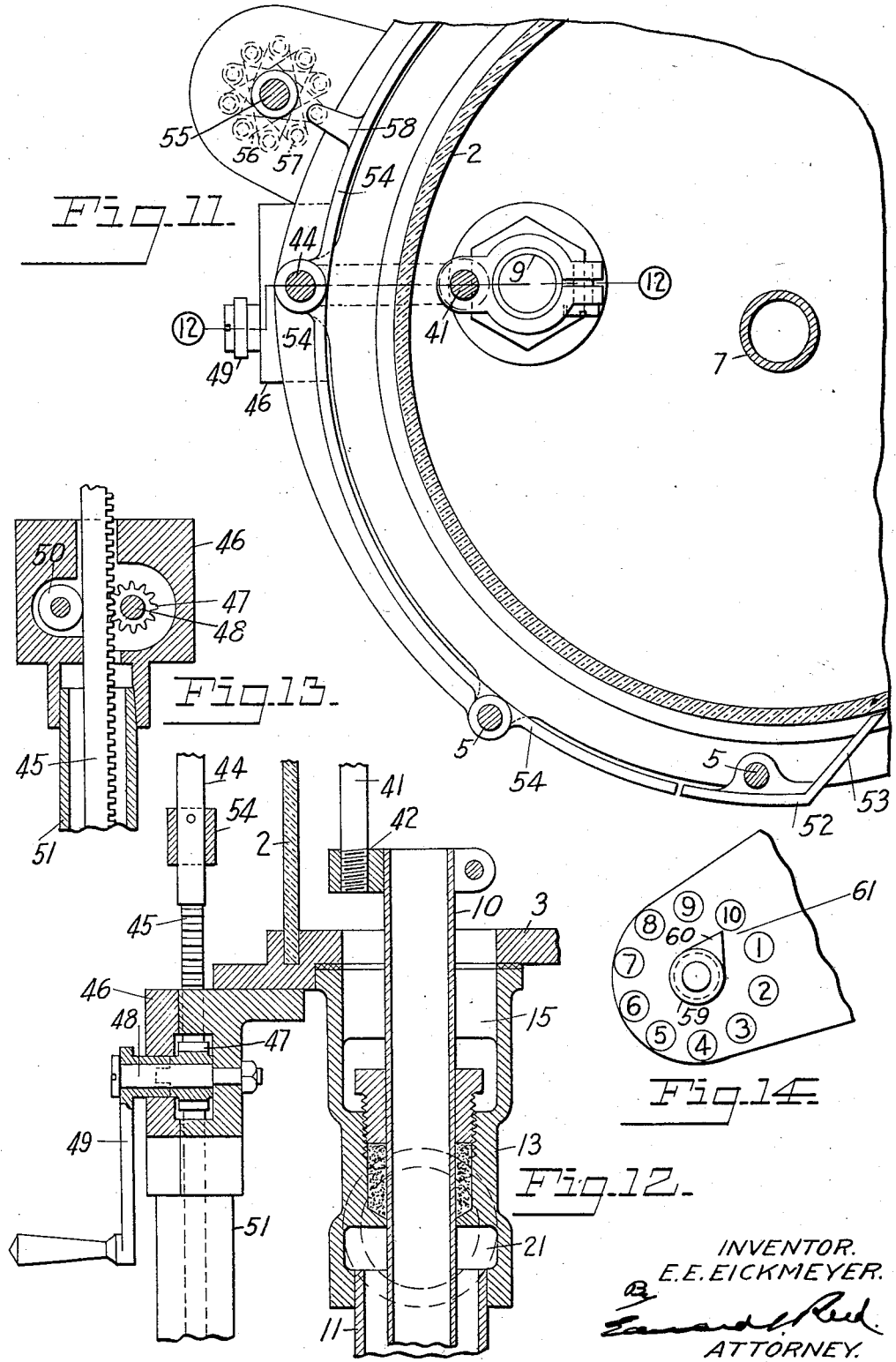

March 24, 1931.  E. E. EICKMEYER  1,797,947
LIQUID DISPENSING APPARATUS
Filed June 27, 1925  5 Sheets-Sheet 5
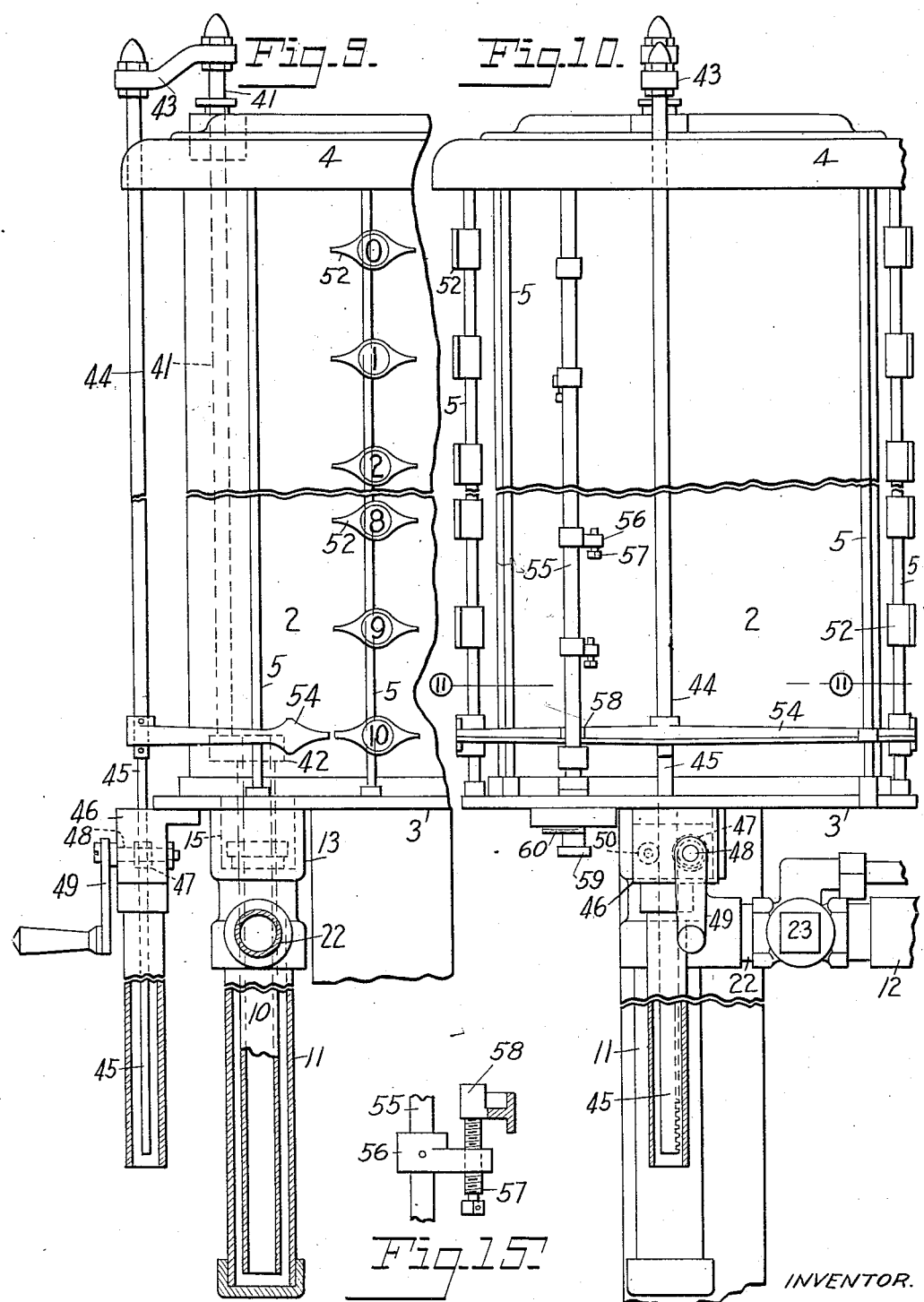
INVENTOR.
E.E.EICKMEYER.
ATTORNEY.

Patented Mar. 24, 1931

1,797,947

UNITED STATES PATENT OFFICE

EARL E. EICKMEYER, OF DAYTON, OHIO, ASSIGNOR TO THE NATIONAL PUMPS CORPORATION, OF DAYTON, OHIO, A CORPORATION OF OHIO

LIQUID-DISPENSING APPARATUS

Application filed June 27, 1925. Serial No. 39,986.

This invention relates to liquid dispensing apparatus and more particularly to that type of dispensing apparatus which comprises a visible delivery bowl.

One object of the present invention is to provide a dispensing apparatus of this character in which the delivery bowl will have an adjustable outlet pipe which can be quickly and easily manipulated to cause the delivery from the bowl of the desired quantity of liquid.

A further object of the invention is to provide such an apparatus having means for indicating the position of the outlet pipe and the quantity of liquid which will be delivered thereby.

A further object of the invention is to provide such an apparatus with indicating devices which will be prominently displayed and of such a character that the customer can easily determine the quantity of liquid in the bowl and the position of the outlet pipe.

A further object of the invention is to provide such an apparatus with means for positively determining the position of the outlet pipe so as to insure the delivery of accurately measured quantities of liquid.

Other objects of the invention will appear as the apparatus is described in detail.

In the accompanying drawings Fig. 1 is a side elevation of the upper portion of a dispensing apparatus embodying my invention; Fig. 2 is a vertical sectional view taken on the line 2—2 of Fig. 1; Fig. 3 is a section taken on the line 3—3 of Fig. 2; Fig. 4 is a section taken on the line 4—4 of Fig. 2; Fig. 5 is a vertical section taken through the adjustable outlet pipe and its well; Fig. 6 is a side elevation of the connections between the actuating rod for the adjustable outlet pipe and the operating mechanism therefor; Fig. 7 is a front elevation of the actuating crank and its associated parts, partly broken away, with the door in its open position; Fig. 8 is a vertical sectional view taken centrally of Fig. 7 and showing the door in its closed position; Fig. 9 is a front elevation, partly broken away, of the bowl and its associated devices showing a modified form of the apparatus; Fig. 10 is a side elevation, partly broken away, of the apparatus shown in Fig. 7; Fig. 11 is a transverse sectional view taken on the line 11—11 of Fig. 10; Fig. 12 is a sectional view taken vertically through the adjustable outlet pipe and its actuating device on the line 12—12 of Fig. 11; Fig. 13 is a sectional detail view of the rack and pinion operated device for the adjustable outlet pipe; Fig. 14 is a bottom plan view showing the indicator for the positive stops; and Fig. 15 is a detail view of one of the positive stops.

In these drawings I have illustrated two embodiments of my invention which, in the main features of their construction, are similar and each of which comprises a main supporting structure or hollow standard 1 in the lower portion of which the pumping mechanism, not here shown, is arranged. Mounted upon the upper end of this standard is a delivery receptacle adapted to receive liquid from the pump and discharge the same through a suitable discharge line to the desired point of delivery. This receptacle preferably is provided with a transparent wall through which the liquid within the receptacle may be observed and the quantity of liquid therein determined. As here shown, the receptacle comprises a glass cylinder 2 supported at its lower end on a base 3 which may be in the form of a casting supported on the standard 1. The upper end of the cylinder is closed by a top plate or cap 4 which rests thereon and which is connected with the base 3 by tie rods 5. Preferably the cylinder is surrounded by a metal screen 6 to protect the same from injury. A supply pipe 7 leads from the pump through the bottom wall or base 3 into the receptacle or visible delivery bowl and, as here shown, this pipe extends to a point near the top of the receptacle and is provided with a downwardly extending portion 8 which terminates near the bottom of the receptacle. The receptacle is also provided with a fixed overflow pipe 9 which leads from the receptacle back to the storage tank from which the liquid is pumped and which is so arranged that the bowl cannot be filled beyond its intended capacity which, in the present instance, is ten gallons.

Slidably mounted in the base 3 is a vertically adjustable outlet pipe 10 the upper end of which extends into the bowl and the lower portion of which extends into a well 11 which in turn is connected with the discharge pipe, which is preferably in the form of a flexible hose 12. As here shown, the base 3 is provided with a downwardly extending portion or boss 13 in which the outlet pipe is slidably mounted and which is provided with a packing gland 14 to provide a tight joint about the pipe so that no liquid can pass from the bowl to the discharge line without going through the outlet pipe. The upper portion of the boss is enlarged to form a chamber 15 having a removable wall or closure 16 by means of which access can be had to the chamber 3 for the purpose of draining the same or for adjusting the packing gland. The well 11 comprises a tube of an internal diameter considerably greater than the external diameter of the outlet pipe 10 and the upper end of this tube is rigidly mounted in the lower portion of the boss 13 and the lower end of the tube is closed by a cap 17. It will be understood that the outlet pipe communicates with the well 11 at its lower end and, in the present construction, the lower end of the pipe is closed by a disk 18 in which is mounted an actuating rod 19 and the pipe is provided just above this disk with outlet openings 20 leading therefrom into the well. The boss 13 in the form here shown, has an enlarged chamber 21 formed therein at the upper end of the tube forming the well and below the packing gland, this chamber constituting in effect part of the well, and connected with this chamber is a short pipe or nipple 22 with which the flexible hose 12 is connected and which is controlled by a cut-off valve 23, which is normally closed.

It will be apparent, therefore, that, when the delivery bowl has been filled to its capacity the liquid will be retained therein so long as the valve 23 of the discharge line is closed. By adjusting the outlet pipe 10 to the desired level the liquid above that pipe may be withdrawn through the well and the discharge line. The adjustment of the outlet pipe may be effected in various ways and in that form of the apparatus shown in Figs. 1 to 6 the actuating mechanism is connected with the lower end of the outlet pipe through the medium of the rod 19 which, as has been explained, extends through the bottom cap 17 of the well, which is provided with a packing gland 24 to prevent leakage about the rod. The lower end of this rod is secured to a bracket 25 which is slidably mounted on a guide rod 26, supported at its upper and lower ends in fixed parts of the apparatus and with which is also connected an upwardly extending toothed bar or rack 27. Meshing with the rack 27 is a gear 28 which is rigidly secured to a shaft 29 journaled in a bearing 30 formed in a supporting plate 31 which is here shown in the form of a casting mounted in the side wall of the standard 1 and having its inner portion offset from the wall of the standard so as to lie in a vertical plane. The rack 27 travels in a guideway in bracket 40 carried by the closure 31, which serves to retain the rack in mesh with the gear. The outer end of the shaft 29 has secured thereto an operating crank 32. If desired, a suitable indicator may be associated with the handle 32 to indicate the position of the outlet pipe and, as here shown, the intermediate portion of the crank is enlarged and provided with an opening adapted to register with graduations 35 carried by the plate 31. Preferably a pointer 34 is arranged within the opening to properly center the same with relation to the graduation. The graduations are arranged to indicate gallons and the arrangement is such that that graduation indicated by the opening and pointer 34 will indicate the number of gallons of liquid above the upper end of the outlet pipe and which will be discharged from the bowl when the valve 23 is opened.

I have also provided means for positively locating the upper end of the discharge pipe in such a manner that it will discharge an exact amount of liquid called for by the designation or graduation 35 and to this end I have provided the crank or handle 32 with a stop, here shown as an arm 65 rigidly secured to the hub portion of the crank and extending substantially radially therefrom. Each of the graduations 35 is mounted on a disk 66 which is rigidly secured to and constitutes the head of a plunger 67 slidably mounted in the plate 31. This plunger carries a second stop or arm 68 which is movable into and out of the path of the stop 65 on the crank and is so arranged that when engaged by the stop 65 it will accurately position the discharge pipe. A spring pressed detent 69 is arranged to engage either of two recesses 70 in the plunger to hold the same with the stop in either its operative or inoperative position, the plunger being splined or otherwise held against rotation. Each stop 68 has means for adjusting the point of contact with the stop 65 so as to permit each of the stops 68 to be adjusted and sealed to insure the accurate positioning of the discharge pipe. As here shown, a screw 71 is mounted in the end of each stop arm 68 and the end of this screw forms a contact member between the arm 68 and the stop 65. By adjusting this screw the position in which the movement of the crank 32, and consequently of the discharge pipe, is arrested may be varied. The sealing of the stops may, if desired, be accomplished by sealing the individual screws 71 but, as a matter of convenience, I have enclosed the ends of the stop arms 68 and the screws in a housing which comprises a flange 72 extending forwardly from the plate 31 and having slots 73 through which the ends of the arms 68 project. The outer end of this housing is closed by a plate 74 which may be secured thereto in any suitable manner, as by means of screws 75, and this plate is sealed to the flange 72, as shown at 76, thus enclosing the adjustable parts of the stops in a sealed housing.

It is desirable that the measuring bowl should be drained at night or at other times when the pump is not in use and the present apparatus is not provided with a separate drain pipe but is drained through the discharge hose, the nozzle of which may be inserted in a drain housing or socket at the base of the pump, as shown and described in my co-pending application filed March 14, 1925, Serial No. 15,471. To insure the draining of the bowl when the hose is connected with the drain pipe I have provided means which make it necessary for the discharge pipe to be in its lowermost or ten gallon position before the pump can be locked up for the night. To this end the operating mechanism, consisting of the crank 32 and its associated parts, are arranged in a casing consisting of a flange 77 extending forwardly from the plate 31 and having hinged thereto a closure or door 78 which may be moved into a position to close the front end of the casing 77. This closure or door is provided with a recess 79 so arranged that it will receive the crank 32 when the latter is in its ten gallon position, and thus permit the closure to be moved to its closed position. If the crank is not accurately located in the ten gallon position the door cannot be closed. The door is here shown as locked, by means of a padlock 80, to the crank itself but it will be understood that the door may be locked to any suitable part of the apparatus and that the crank will be held against movement by its location in the recess 79.

I have also associated with the bowl itself means for indicating both the quantity of liquid contained therein and the position of the outlet pipe, the indications being so arranged that in indicating the position of the outlet pipe they will also indicate the amount of liquid lying above the upper end of the outlet pipe, provided the receptacle is filled to its capacity. To this end I have arranged within the receptacle or bowl and alongside of the transparent wall thereof a vertically arranged series of indicators 36 which, in the present arrangement, are rigidly secured to a vertical rod 37 so arranged that the indicators will lie fairly close to the wall of the bowl. Each indicator as here shown, has oppositely extending pointers, one of which may be utilized to indicate the level of the liquid in the bowl and the other of which may cooperate with a second indicator, which is movable with the outlet pipe, to indicate the position of the outlet pipe. Obviously a single pointer could accomplish both results but I have found it more satisfactory to provide the double pointed indicators. The movable indicating device is mounted for vertical movement in fixed relation to the outlet pipe and is preferably in the form of a relatively large pointer or arrow 38, the point of which is so arranged that it will just clear the adjacent ends of the fixed indicators 36, so that its position with relation thereto can be very easily determined. In this particular form of the apparatus the arrow 38 is carried by an arm 39 rigidly secured to the upper end of the outlet pipe 10 so that the arrow always occupies a fixed relation to the upper end of the outlet pipe. The fixed indicators 36 are numbered in reverse order, that is, the zero indication is at the top and the ten gallon indication is at the bottom, the zero indication being arranged at the level of the liquid when the receptacle is filled to its capacity. Consequently when the adjustable indicator 38 is moved into line with one of the fixed indicators that fixed indicator will represent the quantity of liquid which will be discharged through the outlet pipe when the valve 23 is opened. In the present arrangement the fixed indicators carry a single series of numerals and in determining the quantity of liquid in the receptacle these must be read in reverse order, though obviously a second series of numerals could be provided if desired. If desired, the indicators 36 and 38 may be duplicated on the opposite sides of the bowl, as shown in Figs. 2 and 3, this being particularly desirable where the apparatus is so arranged that the liquid may be delivered on either side thereof. It will be observed that the indicators are of relatively large size so that they can be easily observed and the position of the outlet pipe and the level of the liquid in the bowl readily determined by a customer at a point somewhat remote from the apparatus, as when gasoline is being delivered to an automobile and the customer remains in the automobile.

In that form of the apparatus shown in Figs. 9 to 15 the construction and arrangement of the bowl and of the inlet and outlet pipes is subsantially the same as that above described, with the exception that the inlet pipe 7 is not provided with a downturned portion and the lower end of the well 11 is closed by a solid cap instead of a cap having a passageway therethrough. The outlet pipe 10 is actuated by a rod 41 connected with the upper end thereof by means of a collar 42 clamped to the pipe and extending upwardly through the top wall or cap 4. The upper portion of this rod, above the bowl, is connected by means of a bracket 43 with a rod 44 which extends downwardly alongside the bowl exteriorly thereof and is provided at its lower end with a toothed bar or rack 45 which is slidably mounted in a guideway formed in a bracket 46 secured to the base 3. Mounted in a recess in this bracket is a pinion 47 which meshes with the rack 45 and is carried by a shaft 48 one end of which extends beyond the bracket and is provided with an operating handle or crank 49. A roller 50 also mounted in a recess in the bracket 46 engages the rear edge of the rack to hold the same in mesh with the pinion. If desired, the bracket may be provided on its lower end with a guard to receive the rack, such as a tube 51. In this form of the device the indicators are arranged exteriorly of the bowl and these consist of a series of fixed indicators 52 mounted on one of the tie rods 5. Each of these indicators has one point bent inwardly, as shown at 53, so that it will lie close to the transparent wall of the bowl, to indicate the height of the liquid therein, and has its other point arranged to cooperate with a pointer 54 which is connected with the actuating device for the adjustable outlet pipe. In the present arrangement, this pointer is rigidly secured to the rod 44 so that it will occupy a fixed relation to the upper end of the outlet pipe in all positions of the latter. In this case, as before described, the indicating devices may be provided in duplicate on opposite sides of the bowl.

In this form of the device I have also provided means for positively controlling the position of the outlet pipe so as to insure the delivery of an accurately measured quantity of liquid. To accomplish this I have mounted adjacent to the bowl a vertically arranged series of positive stops which are arranged out of line one with the other and any one of which may be moved into line with a movable stop which is connected with the actuating device for the adjustable outlet pipe. As here shown, I have mounted in the base and cap 4 of the bowl a rod 55 and have mounted on that rod a plurality of laterally extending fingers 56, each having mounted therein a screw 57. These arms extend radially from the rod 55 in different directions so that no two of them are in vertical alinement. The rod is rotatable to bring any one of these stops into the path of a stop finger 58 which, in the present instance, is carried by one of the pointers 54. The adjustable stops 56 are so arranged that when the finger 58 is in engagement with any one of them the pointer 54 will be in line with the corresponding fixed indicator 52. Inasmuch as the bowl is usually supported at a height adjacent to or above the operator's head I have extended the lower end of the rod 55 through the base 3 and provided the same with a knob 59, by means of which it may be rotated. I have also secured to the rod below the base a pointer 60 which travels over a dial 61 having graduations or indications from 1 to 10 thereon, these graduations being so arranged with relation to the pointer that when the latter is in line with any one of them the corresponding stop on the rod 55 will lie in the path of the finger 58 on the pointer.

While I have shown and described two embodiments of my invention I wish it to be understood that I do not desire to be limited to the details thereof as various modifications may occur to a person skilled in the art.

Having now fully described my invention, what I claim as new and desire to secure by Letters Patent, is:

1. In a liquid dispensing apparatus, a receptacle having a transparent cylindrical wall, means for delivering liquid to said receptacle, rods extending between the top and bottom walls of said receptacle near the opposite sides thereof, a vertically arranged series of pointers mounted on each of said rods adjacent to said transparent wall and spaced apart to divide said cylinder into substantially equal portions, a vertically adjustable outlet pipe extending into said receptacle, means to adjust said outlet pipe, and pointers connected with said outlet pipe and arranged to cooperate with the respective series of indicators to indicate the position of said outlet pipe.

2. In a dispensing apparatus, a receptacle comprising a base having a part depending therefrom and forming a chamber, a packing gland mounted in the lower wall of said chamber, an adjustable outlet pipe slidably mounted in said packing gland and extending into said receptacle, a well secured to and depending from the lower wall of said chamber, said outlet pipe being in open communication with said well, and a discharge pipe communicating with said well below said packing gland, said chamber having a removable wall to permit access to be had to the interior thereof.

3. In a device of the character described, a receptacle having an inlet for liquid, an outlet pipe mounted for vertical adjustment in said receptacle, an actuating device for said outlet pipe comprising a crank, a stop carried by said crank, a plurality of stops movable into and out of line with the first mentioned stop, and designations associated with each of the last mentioned stops to indicate the position of the outlet pipe when the first mentioned stop is in engagement with one of the last mentioned stops.

4. In a device of the character described, a receptacle having an inlet for liquid, an outlet pipe mounted for vertical adjustment in said receptacle, an actuating device for said outlet pipe comprising a crank, a stop carried by said crank, a plurality of stops movable into and out of line with the first mentioned stop, designations associated with each of the last mentioned stops to indicate the position of the outlet pipe when the first mentioned stop is in engagement with one of the last mentioned stops, and means for retaining the last mentioned stops in either their operative positions or their inoperative positions.

5. In a device of the character described, a receptacle having an inlet for liquid, an outlet pipe mounted for vertical adjustment in said receptacle, an actuating device for said outlet pipe comprising a crank, a stop carried by said crank, a plurality of stops movable into and out of line with the first mentioned stop, and designations associated with each of the last mentioned stops to indicate the position of the outlet pipe when the first mentioned stop is in engagement with one of the last mentioned stops, each of the last mentioned stops having means for adjusting the point of contact with the first mentioned stop.

6. In a device of the character described, a receptacle having an inlet for liquid, an outlet pipe mounted for vertical adjustment in said receptacle, an actuating device for said outlet pipe comprising a crank, a stop connected with said crank, a plurality of plungers mounted about the axis of said crank, a stop carried by each plunger and movable therewith into and out of a position in line with the first mentioned stop, disks carried by the respective plungers, and designations on said disk to indicate the position of said outlet pipe when said first mentioned stop is in engagement with one of the last mentioned stops.

7. In a device of the character described, a receptacle having an inlet for liquid, an outlet pipe mounted for vertical adjustment in said receptacle, an actuating device for said outlet pipe comprising a crank, a stop connected with said crank, a plurality of plungers mounted about the axis of said crank, a stop carried by each plunger and movable therewith into and out of a position in line with the first mentioned stop, disks carried by the respective plungers, and designations on said disk to indicate the position of said outlet pipe when said first mentioned stop is in engagement with one of the last mentioned stops, each of the last mentioned stops comprising an adjustable contact member.

8. In a device of the character described, a receptacle having an inlet for liquid, an outlet pipe mounted for vertical adjustment in said receptacle, an actuating device for said outlet pipe comprising a crank, a stop connected with said crank, a plurality of plungers mounted about the axis of said crank, an arm secured to each of said plungers, an adjustable member carried by each of said arms and movable into and out of the path of the first mentioned stop by the movement of said plunger, a casing enclosing said adjustable members, and a removable closure for said casing adapted to be sealed thereto.

9. In a liquid dispensing apparatus, a receptacle having a transparent wall, means for delivering liquid to said receptacle, a series of indicating devices arranged within said receptacle adjacent to the transparent wall thereof, a vertically adjustable outlet pipe extending into said receptacle, means to adjust said outlet pipe, and a vertically movable indicator connected with said adjusting means for movement thereby into line with any one of said indicating devices to indicate the position of said outlet pipe.

10. In a liquid dispensing apparatus, a receptacle having a transparent wall, means for delivering liquid to said receptacle, a vertical series of indicating devices arranged within said receptacle adjacent to the transparent wall thereof and each comprising a pointer, a vertically adjustable outlet pipe extending into said receptacle, means to adjust said outlet pipe, and a vertically movable pointer connected with said adjusting means for movement thereby into line with the pointer of one of said indicating devices to indicate the position of said outlet pipe.

11. In a liquid dispensing apparatus, a receptacle having a transparent wall, means for delivering liquid to said receptacle, a vertical series of indicating devices arranged alongside of said receptacle adjacent to the transparent wall thereof, a vertically adjustable outlet pipe extending into said receptacle, means to adjust said outlet pipe, and a pointer supported by and in fixed relation to said outlet pipe for movement thereby into line with a selected one of said indicating devices.

12. In a device of the character described, a receptacle having an inlet for liquid, an outlet pipe mounted for vertical adjustment in said receptacle, an actuating device for said outlet pipe, a series of indicating devices separate from the wall of said receptacle and arranged in fixed positions alongside of and adjacent to the side wall of said receptacle, and a movable indicator operatively connected with said actuating device for movement thereby into line with a selected one of said fixed indicating devices.

In testimony whereof, I affix my signature hereto.

EARL E. EICKMEYER.